United States Patent
Kinoshita et al.

(10) Patent No.: US 10,226,957 B2
(45) Date of Patent: Mar. 12, 2019

(54) RECORDING MATERIAL AND RECORDING SHEET

(71) Applicant: NIPPON SODA CO., LTD., Tokyo (JP)

(72) Inventors: Shuntaro Kinoshita, Ichihara (JP); Kazumi Hamakawa, Ichihara (JP); Hiroshi Sakai, Ichihara (JP); Kayoko Tada, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 0 days.

(21) Appl. No.: 15/546,202

(22) PCT Filed: Jan. 27, 2016

(86) PCT No.: PCT/JP2016/000404
§ 371 (c)(1),
(2) Date: Jul. 25, 2017

(87) PCT Pub. No.: WO2016/125460
PCT Pub. Date: Aug. 11, 2016

(65) Prior Publication Data
US 2018/0022137 A1  Jan. 25, 2018

(30) Foreign Application Priority Data
Feb. 4, 2015  (JP) .................. 2015-019879

(51) Int. Cl.
| | | |
|---|---|---|
| *B41M 5/333* | (2006.01) | |
| *B41M 5/337* | (2006.01) | |
| *D21H 27/00* | (2006.01) | |
| *C09B 11/24* | (2006.01) | |
| *C09B 11/28* | (2006.01) | |
| *B41M 5/327* | (2006.01) | |

(52) U.S. Cl.
CPC ........ *B41M 5/3375* (2013.01); *B41M 5/3333* (2013.01); *B41M 5/3336* (2013.01); *C09B 11/24* (2013.01); *D21H 27/00* (2013.01); *B41M 5/3275* (2013.01); *C09B 11/28* (2013.01)

(58) Field of Classification Search
CPC .... B41M 5/145; B41M 5/1455; B41M 5/155; B41M 5/3275; B41M 5/333; B41M 5/3336; B41M 5/3375
USPC ........................ 503/209, 216, 217
See application file for complete search history.

(56) References Cited

U.S. PATENT DOCUMENTS

| | | |
|---|---|---|
| 2003/0139293 A1 | 7/2003 | Taylor et al. |
| 2004/0171487 A1 | 9/2004 | Kajikawa et al. |
| 2015/0284321 A1 | 10/2015 | Sakai et al. |

FOREIGN PATENT DOCUMENTS

| | | |
|---|---|---|
| CN | 1524710 A | 9/2004 |
| EP | 0262953 A2 | 4/1988 |
| JP | S61-182982 A | 8/1986 |
| JP | S62-27176 | 2/1987 |
| JP | S62-167074 | 7/1987 |
| JP | H04-221680 A | 8/1992 |
| JP | 2003-528752 A | 9/2003 |
| JP | 2004-276593 A | 10/2004 |
| TW | 201429935 A | 8/2014 |
| WO | 2014-080615 A1 | 5/2014 |

OTHER PUBLICATIONS

Aug. 8, 2017 International Preliminary Report on Patentability issued in International Patent Application No. PCT/JP2016/000404.
Apr. 5, 2016 International Search Report issued in International Patent Application No. PCT/JP2016/000404.
Jun. 21, 2018 Office Action issued in Korean Patent Application No. 10-2017-7021157.

*Primary Examiner* — Bruce H Hess
(74) *Attorney, Agent, or Firm* — Oliff PLC

(57) ABSTRACT

An object of the invention is to provide a recording material and recording sheet having excellent color-developing performance, storage stability, etc. A recording material having good color-developing performance and storage stability may be obtained by using a specific compound having a benzhydrol skeleton as an additive in a recording material employing color development through a reaction between a color former and a color-developing agent.

4 Claims, No Drawings

RECORDING MATERIAL AND RECORDING SHEET

TECHNICAL FIELD

The present invention relates to a recording material employing color development through a reaction between a color former and a color-developing agent, and a recording sheet using the recording material.

The present application claims priority of Japanese Patent Application No. 2015-019879 filed on Feb. 4, 2015, the content of which is incorporated herein by reference.

BACKGROUND ART

The recording material employing color development through a reaction between a color former and a color-developing agent, since record may be made by a relatively simple apparatus in a short time without applying a complicated treatment such as development and fixation, are widely used in e.g., thermal recording paper for output-recording from a facsimile, a printer or the like, or pressure-sensitive copying paper of a ledger sheet for simultaneous copying to several sheets. As these recording materials, materials quickly developing color and keeping whiteness of uncolored part (hereinafter referred to as "background") and providing highly robust colored images are desired, however, in view of long-term storage stability, a recording material providing background and images having excellent heat resistance is particularly desired. To attain this, it has been desired to develop a color former, a color-developing agent, a storage stabilizer and the like and thereby obtain a recording material having a further well-balanced color-developing sensitivity, background and image storage stability, etc.

In Patent Documents 1 to 3, it is described that a compound having a skeleton consisting of an alkylene group having at least a hydroxyl group and two benzene nuclei bound to the alkylene group, may be used as a sensitizer for a thermal recording material in combination with a specific color former and color-developing agent. Also in Patent Document 4, it is described that a non-phenol compound may be used as a color-developing agent.

PRIOR ART DOCUMENTS

Patent Documents

Patent Document 1: Japanese unexamined Patent Application Publication No. S62-27176
Patent Document 2: Japanese unexamined Patent Application Publication No. S62-167074
Patent Document 3: Japanese unexamined Patent Application Publication No. H4-221680
Patent Document 4: International Publication WO 2014/080615

SUMMARY OF INVENTION

Object to be Solved by the Invention
An object of the present invention is to provide a recording material and recording sheet having good color-developing performance, storage stability, etc.
Means to Solve the Object
The present inventors conducted studies on additives suitably used in combination with color-developing agents. During the period, they found that when a specific compound having a benzhydrol skeleton is used as an additive, the color-developing performance (sensitization effect) is improved and the storage stability is good. Based on the finding, the present invention has been completed.

More specifically, the present invention relates to,
(1) A recording material comprising
(A) at least one color former,
(B) at least one compound selected from the group consisting of the compounds represented by the following formula (I):

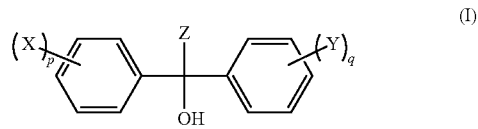

(wherein X and Y each independently represent a halogen atom, a nitro group, a $C_1$ to $C_6$ alkyl group, a $C_1$ to $C_6$ alkoxy group, a $C_2$ to $C_6$ alkenyl group, a $C_1$ to $C_6$ haloalkyl group or a $C_2$ to $C_6$ haloalkenyl group, p and q each independently represent any integer of 0 to 5 and Z represents a hydrogen atom, a $C_1$ to $C_6$ alkyl group, a $C_1$ to $C_6$ alkoxy group, a $C_2$ to $C_6$ alkenyl group, a $C_1$ to $C_6$ haloalkyl group or a $C_2$ to $C_6$ haloalkenyl group), and
(C) a color-developing agent and at least one compound selected from the group consisting of a compound represented by the following formula (II):

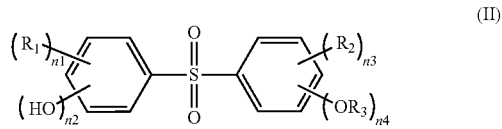

(wherein $R_1$ and $R_2$ each independently represent a halogen atom, a $C_1$ to $C_6$ alkyl group optionally having a substituent, a $C_2$ to $C_6$ alkenyl group optionally having a substituent, an arylsulfonyl group optionally having a substituent, n1 represents any integer of 0 to 4, n2 represents 1 or 2 (with the proviso that n1+n2 is any integer of 1 to 5), n3 represents any integer of 0 to 5, n4 represents 0 or 1 (with the proviso that n3+n4 is any integer of 0 to 5), $R_3$ is a hydrogen atom, a $C_1$ to $C_6$ alkyl group optionally having a substituent, a $C_2$ to $C_6$ alkenyl group optionally having a substituent, an aralkyl group optionally having a substituent or an arylsulfonyl group optionally having a substituent),
a compound represented by the following formula (III):

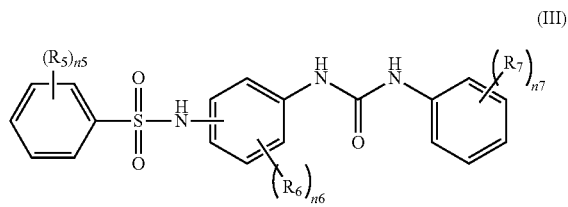

(wherein $R_5$ to $R_7$ represent a hydrogen atom, a halogen atom, a nitro group, a $C_1$ to $C_6$ alkyl group, a $C_1$ to $C_6$ alkoxy group, a $C_2$ to $C_6$ alkenyl group, a $C_1$ to $C_6$ fluoroalkyl group, an $N(R_8)_2$ group (wherein $R_8$ represents a hydrogen atom, a phenyl group, a benzyl group, a $C_1$ to $C_6$ alkyl group), NHCOR$_9$ (wherein R$_9$ represents a C$_1$ to C$_6$ alkyl group), a phenyl group optionally having a substituent or a benzyl group optionally having a substituent, n5 and n7 each independently represent any integer of 1 to 5, and n6 represents any integer of 1 to 4), a compound represented by the following formula (IV):

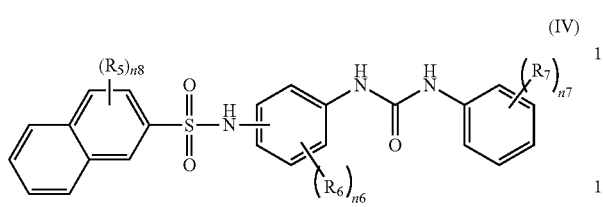

(IV)

(wherein R$_5$ to R$_7$ are the same as R$_5$ to R$_7$ in formula (III), n6 and n7 are the same as n6 and n7 in formula (III) and n8 represents any integer of 1 to 7), a compound represented by the following formula (V):

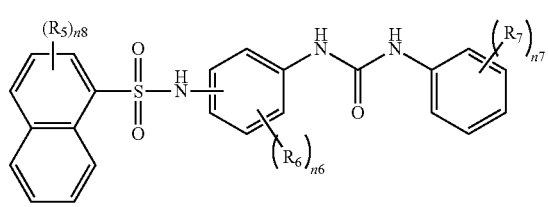

(V)

(wherein R$_5$ to R$_7$ are the same as R$_5$ to R$_7$ in formula (III), and n6, n7 and n8 are the same as n6, n7 and n8 in formula (IV), a compound represented by the following formula (VI):

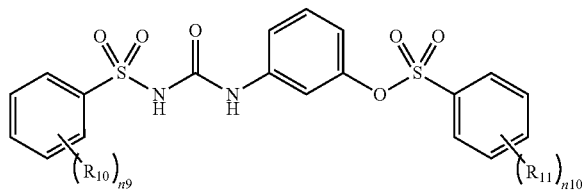

(VI)

(wherein R$_{10}$ and R$_{11}$ each independently represent a C$_1$ to C$_6$ alkyl group, and n9 and n10 each independently represent any integer of 0 to 5), and a compound represented by the following formula (VII):

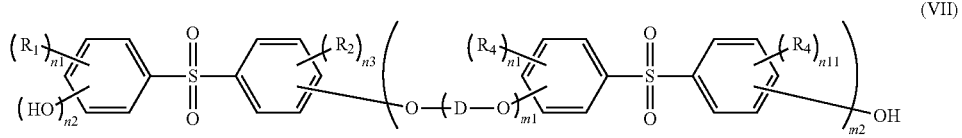

(VII)

(wherein D represents a linear, branched or cyclic C$_1$ to C$_{12}$ hydrocarbon group or a group represented by the following formula (VIII) or formula (IX):

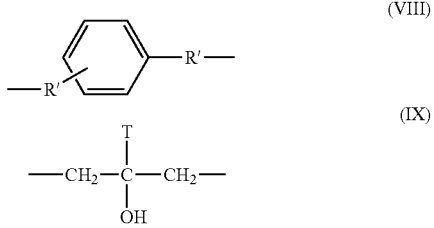

(VIII)

(IX)

(wherein R' represents a methylene group or an ethylene group, T represents a hydrogen atom or a C$_1$ to C$_4$ alkyl group), m1 represents any integer of 1 to 6, R$_4$ each independently represent a halogen atom, a C$_1$ to C$_6$ alkyl group or a C$_2$ to C$_6$ alkenyl group, n11 each independently represent any integer of 0 to 4, and m2 represents any integer of 1 to 6, and R$_1$, R$_2$, n1, n2 and n3 represent the same as R$_1$, R$_2$, n1, n2 and n3 in formula (II));

(2) A recording material comprising
(A) at least one color former,
(B) at least one selected from the group consisting of compounds represented by the following formula (X):

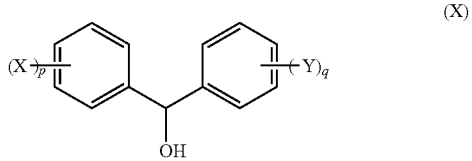

(X)

(wherein X and Y each independently represent a halogen atom, a nitro group, a C$_1$ to C$_6$ alkyl group, a C$_1$ to C$_6$ alkoxy group, a C$_2$ to C$_6$ alkenyl group, a C$_1$ to C$_6$ haloalkyl group or a C$_2$ to C$_6$ haloalkenyl group, and p and q each independently represent any integer of 0 to 5), and
(C) at least one color-developing agent;

(3) The recording material according to (2), wherein the color-developing agent (C) is at least one compound selected from the group consisting of a compound represented by the following formula (II):

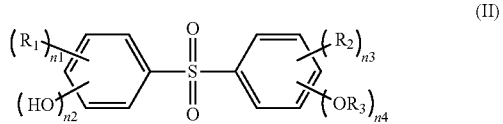

(II)

(wherein $R_1$ and $R_2$ each independently represent a halogen atom, a $C_1$ to $C_6$ alkyl group optionally having a substituent, a $C_2$ to $C_6$ alkenyl group optionally having a substituent, an arylsulfonyl group optionally having a substituent, n1 represents any integer of 0 to 4, n2 represents 1 or 2 (with the proviso that n1+n2 is any integer of 1 to 5), n3 represents any integer of 0 to 5, n4 represents 0 or 1 (with the proviso that n3+n4 is any integer of 0 to 5), $R_3$ is a hydrogen atom, a $C_1$ to $C_6$ alkyl group optionally having a substituent, a $C_2$ to $C_6$ alkenyl group optionally having a substituent, an aralkyl group optionally having a substituent or an arylsulfonyl group optionally having a substituent), a compound represented by the following formula (III):

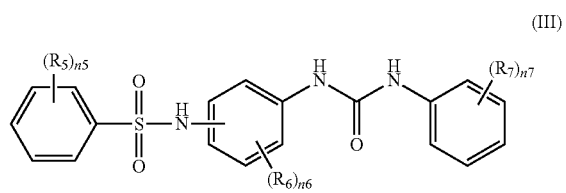

(III)

(wherein $R_5$ to $R_7$ represent a hydrogen atom, a halogen atom, a nitro group, a $C_1$ to $C_6$ alkyl group, a $C_1$ to $C_6$ alkoxy group, a $C_2$ to $C_6$ alkenyl group, a $C_1$ to $C_6$ fluoroalkyl group, an $N(R_8)_2$ group (wherein $R_8$ represents a hydrogen atom, a phenyl group, a benzyl group, a $C_1$ to $C_6$ alkyl group), $NHCOR_9$ (wherein $R_9$ represents a $C_1$ to $C_6$ alkyl group), a phenyl group optionally having a substituent or a benzyl group optionally having a substituent, n5 and n7 each independently represent any integer of 1 to 5, and n6 represents any integer of 1 to 4), a compound represented by the following formula (IV):

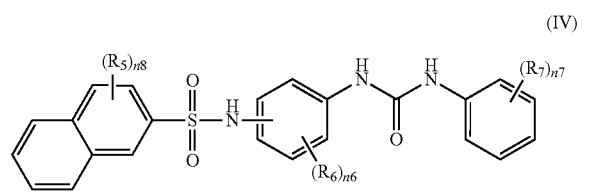

(IV)

(wherein $R_5$ to $R_7$ are the same as $R_5$ to $R_7$ in formula (III), n6 and n7 are the same as n6 and n7 in formula (III) and n8 represents any integer of 1 to 7)

a compound represented by the following formula (V):

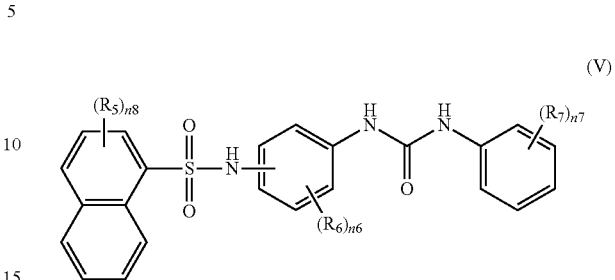

(V)

(wherein $R_5$ to $R_7$ represent the same as $R_5$ to $R_7$ in formula (III), and n6, n7 and n8 are the same as n6, n7 and n8 in formula (IV)), a compound represented by the following formula (VI):

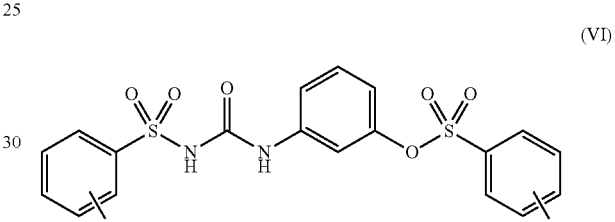

(VI)

(wherein $R_{10}$ and $R_{11}$ each independently represent a $C_1$ to $C_6$ alkyl group, and n9 and n10 each independently represent any integer of 0 to 5), and a compound represented by the following formula (VII): and

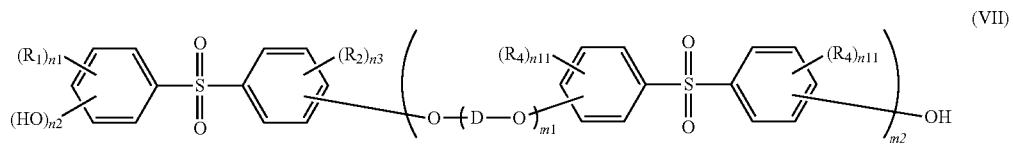

(VII)

(wherein D represents a linear, branched or cyclic $C_1$ to $C_{12}$ hydrocarbon group or a group represented by the following formula (VIII) or formula (IX):

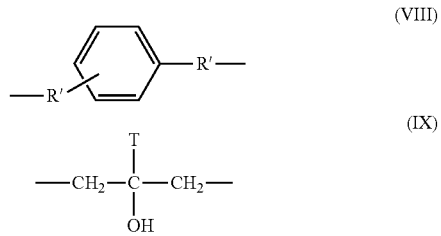

(VIII)

(IX)

(wherein R' represents a methylene group or an ethylene group, T represents a hydrogen atom or a $C_1$ to $C_4$ alkyl group), m1 represents any integer of 1 to 6, $R_4$ each independently represent a halogen atom, a $C_1$ to $C_6$ alkyl group or a $C_2$ to $C_6$ alkenyl group, n11 each independently represent an integer of 0 to 4, m2 represents any integer of 1 to 6, and $R_1$, $R_2$, n1, n2 and n3 are the same as $R_1$, $R_2$, n1, n2 and n3 in formula (II));

(4) The recording material according to any one of (1) to (3), wherein the color former is a fluoran dye; and (5) A recording sheet having a recording material layer formed from the recording material according to any one of (1) to (4) on a support.

Effects of the Invention

According to the present invention, it is possible to obtain a recording material and a recording sheet having good color-developing performance and storage stability. In particular, a recording material having improved color-developing sensitivity and further superior in heat-resistance of background and water resistance of image may be obtained.

Mode of Carrying Out the Invention (Recording Material)

The recording material of the present invention is a recording material employing color development through a reaction between a color former and a color-developing agent and containing at least a compound represented by the above formula (I). A compound represented by formula (I) is preferably used as a sensitizer which accelerates the color development through a reaction between a color former and a color-developing agent.

The recording material of the present invention is preferably (1) a recording material characterized by containing a color former, a compound represented by formula (I) and the above component (C) as a color-developing agent, or (2) a recording material characterized by using a color former, a compound represented by formula (X) and a color-developing agent.

The recording material of the present invention may be applied to any use, for example, thermal recording materials or pressure sensitive copying materials.

(Recording Material (1))

Recording material (1) is characterized by containing the following components (A), (B) and (C).

Component (A): at least one color former

Component (B): at least one compound represented by the above formula (I)

Component (C): a color-developing agent, which is at least one compound represented by the above formula (II), formula (III), formula (IV), formula (V), formula (VI) or formula (VII).

(Component (A))

As a color former, which is Component (A) to be used in the recording material of the present invention, a leuco dye such as a fluoran dye, a phthalide dye, a lactam dye, a triphenylmethane dye, a phenothiazine dye, a spiropyran dye or the like may be exemplified, however, the color former is not limited to these. Any color former may be used as long as it develops color by being in contact with a color-developing agent as an acid substance. Although these color formers may be used alone to produce a recording material having color specified by the color former beyond any doubt, they may be used by combination of two or more thereof. For example, color formers of three primary colors, red, blue and green or a black color former may be used in combination to produce a recording material developing jet black.

Among them, a fluoran color former may be preferably exemplified.

As the fluoran color former, for example, 3,3-bis(p-dimethylaminophenyl)-phthalide, 3,3-bis(p-dimethylaminophenyl)-6-dimethylaminophthalide (also called as crystal violet lactone), 3,3-bis(p-dimethylaminophenyl)-6-diethylaminophthalide, 3,3-bis(p-dimethylaminophenyl)-6-chlorophthalide, 3,3-bis(p-dibutylaminophenyl)-phthalide, 3-cyclohexylamino-6-chlorofluoran, 3-dimethylamino-5,7-dimethylfluoran, 3-N-methyl-N-isopropylamino-6-methyl-7-anilinofluoran, 3-N-methyl-N-isobutylamino-6-methyl-7-anilinofluoran, 3-N-methyl-N-isoamylamino-6-methyl-7-anilinofluoran, 3-diethylamino-7-chlorofluoran, 3-diethylamino-6,8-dimethylfluoran, 3-diethylamino-7-methylfluoran, 3-diethylamino-7,8-benzofluoran, 3-diethylamino-6-methyl-7-chlorofluoran, 3-dibutylamino-6-methyl-7-bromofluoran, 3-(N-p-tolyl-N-ethylamino)-6-methyl-7-anilinofluoran, 3-pyrrolidino-6-methylamino-7-anilinofluoran, 2-{N-(3'-trifluoromethylphenyl)amino}-6-diethylaminofluoran, 2-{3,6-bis(diethylamino)-9-(o-chloroanilino)xanthylbenzoic acid lactam}, 3-diethylamino-6-methyl-7-(m-trichloromethylanilino)fluoran, 3-diethylamino-7-(o-chloroanilino)fluoran, 3-dibutylamino-7-(o-chloroanilino)fluoran, 3-N-methyl-N-amylamino-6-methyl-7-anilinofluoran, 3-N-methyl-N-cyclohexylamino-6-methyl-7-anilinofluoran, 3-diethylamino-6-methyl-7-anilinofluoran, 3-diethylamino-6-methyl-7-(2',4'-dimethylanilino)fluoran, 3-(N,N-diethylamino)-5-methyl-7-(N,N-dibenzylamino)fluoran, 3-(N,N-diethylamino)-7-(N,N-dibenzylamino)fluoran, 3-(N-ethyl-N-isobutylamino)-6-methyl-7-anilinofluoran, 3-(N-ethyl-N-propylamino)-6-methyl-7-anilinofluoran, 3-(N-methyl-N-propylamino)-6-methyl-7-anilinofluoran, 3-(N-ethyl-N-isopentylamino)-6-methyl-7-anilinofluoran, 3-(N-ethyl-N-toluidino)-6-methyl-7-anilinofluoran, 3-pyrrolidino-6-methyl-7-anilinofluoran, 3-piperidino-6-methyl-7-anilinofluoran, 3-dimethylamino-7-(m-trifluoromethylanilino)fluoran, 3-dipentylamino-6-methyl-7-anilinofluoran, 3-(N-ethoxypropyl-N-ethylamino)-6-methyl-7-anilinofluoran, 3-dibutylamino-7-(o-fluoroanilino)fluoran, 3-diethylaminobenzo[a]fluoran, 3-diethylamino-5-methyl-7-benzylaminofluoran, 3-diethylamino-5-chlorofluoran, 3-diethylamino-6-(N,N'-dibenzylamino)fluoran, 3,6-dimethoxyfluoran, 2,4-dimethyl-6-(4-dimethylaminophenyl)aminofluoran, 3-diethylamino-7-(m-trifluoromethylanilino)fluoran, 3-diethylamino-6-methyl-7-octylaminofluoran, 3-diethylamino-6-methyl-7-(m-tolylamino)fluoran, 3-diethylamino-6-methyl-7-(2,4-xylylamino)fluoran, 3-diethylamino-7-(o-fluoroanilino)fluoran, 3-diphenylamino-6-methyl-7-anilinofluoran, benzoylleucomethylene blue, 6'-chloro-8'-methoxy-benzoindolino-spiropyran, 6'-bromo-3'-methoxy-benzoindolino-spiropyran, 3-(2'-hydroxy-4'-dimethylaminophenyl)-3-(2'-methoxy-5'-chlorophenyl)phthalide, 3-(2'-hydroxy-4'-dimethylaminophenyl)-3-(2'-methoxy-5'-nitrophenyl)phthalide, 3-(2'-hydroxy-4'-diethylaminophenyl)-3-(2'-methoxy-5'-methylphenyl)phthalide, 3-(2'-methoxy-4'-dimethylaminophenyl)-3-(2'-hydroxy-4'-chloro-5'-methylphenyl)phthalide, 3-morpholino-7-(N-propyl-trifluoromethylanilino)fluoran, 3-pyrrolidino-7-trifluoromethylanilinofluoran, 3-diethylamino-5-chloro-7-(N-benzyl-trifluoromethylanilino)fluoran, 3-pyrrolidino-7-(di-p-chlorophenyl)methylaminofluoran, 3-diethylamino-5-chloro-7-(α-phenylethylamino)fluoran, 3-(N-ethyl-p- toluidino)-7-(α-phenylethylamino)fluoran, 3-diethylamino-7-(o-methoxycarbonylphenylamino)fluoran, 3-diethylamino-5-methyl-7-(α-phenylethylamino)fluoran, 3-diethylamino-7-piperidinofluoran, 2-chloro-3-(N-methyl-toluidino)-7-(p-n-butylanilino)fluoran, 3-(N-methyl-N-isopropylamino)-6-methyl-7-anilinofluoran, 3-dibutylamino-6-methyl-7-anilinofluoran, 3-dipentylamino-6-methyl-7-anilinofluoran, 3,6-bis(dimethylamino)fluorenespiro(9,3')-6'-dimethylaminophthalide, 3-(N-benzyl-N-cyclohexylamino)-5,6-benzo-7-α-naphthylamino-4'-bromofluoran, 3-diethylamino-6-chloro-7-anilinofluoran, 3-N-ethyl-N-(2-ethoxypropyl)amino-6-methyl-7-anilinofluoran, 3-N-ethyl-N-tetrahydrofurfurylamino-6-methyl-7-anilinofluoran, 3-diethylamino-6-methyl-7-mesitydino-4',5'-benzofluoran, or 3-(N-ethyl-p-toluidino)-7-(methylphenylamino)fluoran may be exemplified.

Among these color formers, 3,3-bis(p-dimethylaminophenyl)-6-dimethylaminophthalide, 3-cyclohexylamino-6-chlorofluoran, 3-diethylamino-7-chlorofluoran, 3-diethylamino-6,8-dimethylfluoran, 3-diethylamino-7-methylfluoran, 3-diethylamino-7,8-benzofluoran, 3-diethylamino-6-methyl-7-chlorofluoran, 3-dibutylamino-6-methyl-7-bromofluoran, 3-diethylamino-7-(o-chloroanilino)fluoran, 3-dibutylamino-7-(o-chloroanilino)fluoran, 3-N-methyl-N-cyclohexylamino-6-methyl-7-anilinofluoran, 3-(N,N-diethylamino)-5-methyl-7-(N,N-dibenzylamino)fluoran, 3-(N,N-diethylamino)-7-(N,N-dibenzylamino)fluoran, 3-(N-ethyl-N-isobutylamino)-6-methyl-7-anilinofluoran, 3-(N-methyl-N-propylamino)-6-methyl-7-anilinofluoran, 3-(N-ethyl-N-isopentylamino)-6-methyl-7-anilinofluoran, 3-(N-ethyl-N-toluidino)-6-methyl-7-anilinofluoran, 3-(N-ethoxypropyl-N-ethylamino)-6-methyl-7-anilinofluoran, 3-dibutylamino-7-(o-fluoroanilino)fluoran, 3-diethylamino-7-(m-trifluoromethylanilino)fluoran, 3-diethylamino-6-methyl-7-octylaminofluoran, 3-diethylamino-6-methyl-7-(m-tolylamino)fluoran, 3-diethylamino-7-(o-fluoroanilino)fluoran, 3-diphenylamino-6-methyl-7-anilinofluoran, benzoyl leuco methylene blue, 3-dibutylamino-6-methyl-7-anilinofluoran, 3-N-ethyl-N-tetrahydrofurfurylamino-6-methyl-7-anilinofluoran, 3-(N-ethyl-p-toluidino)-7-(methylphenylamino)fluoran or the like may be particularly preferably exemplified.

As a near infrared absorbing dye, 3-[4-[4-(4-anilino)-anilino]anilino]-6-methyl-7-chlorofluoran, 3,3-bis[2-(4-dimethylaminophenyl)-2-(4-methoxyphenyl)vinyl]-4,5,6,7-tetrachlorophthalide, 3,6,6'-tris(dimethylamino)spiro(fluorene-9,3'-phthalide) or the like may be exemplified.

(Component (B))

Component (B) to be used in the recording material of the present invention is a compound represented by the above formula (I). Component (B) preferably exerts an effect as a sensitizer by using it in combination with Component (A) and Component (C) in a recording sheet.

In the above formula (I), as X and Y, a halogen atom, a nitro group, a $C_1$ to $C_6$ alkyl group, a $C_1$ to $C_6$ alkoxy group, a $C_2$ to $C_6$ alkenyl group, a $C_1$ to $C_6$ haloalkyl group, a $C_2$ to $C_6$ haloalkenyl group or the like may be exemplified. Among them, a $C_1$ to $C_6$ alkyl group or a case of p=q=0 is preferable.

As Z, a hydrogen atom, a $C_1$ to $C_6$ alkyl group, a $C_1$ to $C_6$ alkoxy group, a $C_2$ to $C_6$ alkenyl group, a $C_1$ to $C_6$ haloalkyl group, a $C_2$ to $C_6$ haloalkenyl group or the like may be exemplified. Among them, a hydrogen atom or a $C_1$ to $C_6$ alkyl group is preferable.

A compound represented by formula (I) may have optical isomers depending upon whether the substituents represented by X and Y and present on the benzene rings are the same or different; however either one of the isomers may be employed, and a racemic body or any mixture of both isomers may be employed.

A compound represented by formula (I) preferably has a melting point of 40 to 150° C. and particularly 70 to 110° C. in view of storage stability and sensitivity of a thermal recording material.

As a compound represented by formula (I), benzhydrol (melting point 67° C.), 2-methylbenzhydrol (melting point 95° C., abbreviation: MBH), 4-methylbenzhydrol (melting point 50-54° C.), 4,4'-dimethylbenzhydrol (melting point 71-73° C.), 4-chlorobenzhydrol (melting point 60-63° C.), 4,4'-dichlorobenzhydrol (melting point 93° C.), 4,4'-difluorobenzhydrol (melting point 43-45° C.), 2,3,4,5,6-pentafluorobenzhydrol (melting point: 54° C.), decafluorobenzhydrol (melting point 78-81° C.), 1,1-diphenylethanol (melting point 80° C., abbreviation: DPE), 2-chloro-1,1-diphenylethanol, 1,1-diphenylpropanol (melting point 94° C.) or the like may be exemplified.

Among the compounds represented by formula (I), 1,1-diphenylethanol, and a compound where Z is a hydrogen atom, i.e., a compound represented by the following formula (X) is preferably mentioned.

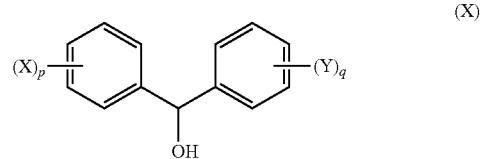

In formula (X), X and Y are the same as X and Y in formula (I) and p and q are the same as p and q in formula (I).

Among the compounds represented by formula (X), 2-methylbenzhydrol is particularly preferable.

(Component (C))

Component (C) to be used in the recording material of the present invention is a color-developing agent, which is at least one selected from the diphenyl sulfone compounds represented by the above formula (II) and compounds represented by formula (III), formula (IV), formula (V), formula (VI) or formula (VII).

(Diphenyl sulfone compounds represented by the formula (II))

In formula (II), as $R_1$ and $R_2$, a halogen atom, a $C_1$ to $C_6$ alkyl group, a $C_2$ to $C_6$ alkenyl group or the like may be exemplified.

As $R_3$, a hydrogen atom, a $C_1$ to $C_6$ alkyl group, a $C_2$ to $C_6$ alkenyl group, an aralkyl group optionally having a substituent or the like may be exemplified. Among them, a hydrogen atom or a $C_1$ to $C_6$ alkyl group is preferable.

As a compound represented by formula (II), more specifically, a hydroxy sulfone such as 4,4'-dihydroxydiphenyl sulfone (abbreviation: 4,4'-BPS), 2,4'-dihydroxydiphenyl sulfone, 4-hydroxy-4'-propoxydiphenyl sulfone, 4-hydroxy-4'-isopropoxydiphenyl sulfone (abbreviation: D-8), 4-hydroxy-4'-butoxydiphenyl sulfone, 4-hydroxy-4'-benzyloxydiphenyl sulfone, 4-hydroxy-4'-allyloxydiphenyl sulfone, bis(3-allyl-4-hydroxyphenyl) sulfone, 3,4-dihydroxy-4'-methyldiphenyl sulfone, 4,4'-dihydroxy-3,3',5,5'-tetrabromodiphenyl sulfone, 4-hydroxy-4'-methyldiphenyl sulfone, 4-hydroxy-4'-benzenesulfonyloxydiphenyl sulfone, 2,4-bis(phenylsulfonyl) phenol, 4,4'-sulfonylbis[2-(2-propenyl)] phenol, 3,4-dihydroxy-4'-methyldiphenyl sulfone, 4-allyloxy-4'-hydroxydiphenyl sulfone, 4,4'-sulfonylbis[2-(2-propenyl)]phenol, and 2,4-bis(phenylsulfonyl)-5-methylphenol; a polyvalent metal salt of a hydroxy sulfone such as a zinc, magnesium, aluminum or titanium salt of 4-phenylsulfonylphenoxy or the like may be exemplified. Among them, D-8 is preferable.

(Non-Phenol Compound Represented by any One of Formulae (III) to (V))

In formulae (III), (IV) and (V), as $R_5$ to $R_7$, a hydrogen atom; a halogen atom; a nitro group; a $C_2$ to $C_6$ alkyl group; a $C_1$ to $C_6$ alkoxy group; a $C_2$ to $C_6$ alkenyl group; a $C_1$ to $C_6$ fluoroalkyl group; an $N(R_8)_2$ group ($R_8$ represents a hydrogen atom, a phenyl group, a benzyl group or a $C_2$ to $C_6$ alkyl group); $NHCOR_9$ ($R_9$ represents a $C_1$ to $C_6$ alkyl group); a phenyl group optionally having a substituent; a benzyl group optionally having a substituent or the like may be exemplified.

As $R_5$ to $R_7$, a hydrogen atom or a linear $C_2$ to $C_6$ alkyl group is preferable. As $R_5$, a hydrogen atom or a methyl group is further preferable. As $R_6$ and $R_7$, a hydrogen atom is further preferable.

As typical compounds represented by formulae (III) to (V), N-(1-(2-phenylureido)phenyl)benzenesulfonamide, N-(1-(3-phenylureido)phenyl)benzenesulfonamide, 4-methyl-N-(2-(3-phenylureido)phenyl)benzenesulfonamide and the like may be exemplified.

(Non-Phenol Compound Represented by Formula (VI))

In formula (VI), $R_{10}$ and $R_{11}$ are $C_1$ to $C_6$ alkyl groups.

As a compound represented by formula (VI), a compound (abbreviation: P-201) represented by the following formula (XII) is preferable.

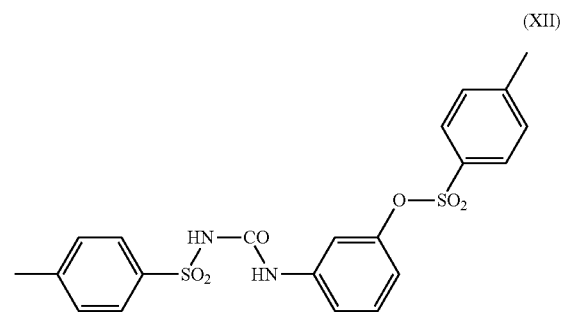

(XII)

In the above, as the substituent used in the phrase "optionally having a substituent", a hydroxyl group, a halogen atom, a $C_1$ to $C_6$ alkyl group, an alkoxy group, an aryl group, an aralkyl group or the like may be exemplified.

(Compound Represented by Formula (VII))

In formula (VII), D is a linear, branched or cyclic $C_1$ to $C_{12}$ hydrocarbon group or a group represented by the following formula (VIII) or formula (IX):

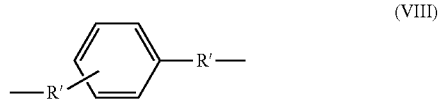

(VIII)

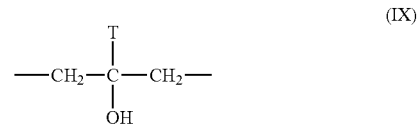

(IX)

(wherein R' represents a methylene group or an ethylene group, T represents a hydrogen atom or a $C_1$ to $C_4$ alkyl group), m1 represents any integer of 1 to 6, $R_4$ each independently represent a halogen atom, a $C_1$ to $C_6$ alkyl group or a $C_2$ to $C_6$ alkenyl group, n11 each independently represent any integer of 0 to 4 and m2 represents any integer of 1 to 6. $R_1$, $R_2$, n1, n2 and n3 are the same as $R_1$, $R_2$, n1, n2 and n3 in formula (II).

In formula (VII), as $R_4$, a halogen atom, a $C_1$ to $C_6$ alkyl group, a $C_2$ to $C_6$ alkenyl group or the like may be exemplified.

As D, a linear $C_1$ to $C_{12}$ hydrocarbon group is preferable, an ethylene group or a propylene group is more preferable and an ethylene group is further preferable.

As m1, 2 is preferable.

In formula (VII), m2 represents any integer of 1 to 6.

As a compound represented by formula (VII), compounds represented by the following formula (XI) or a mixture of them (abbreviation: D-90) is preferable.

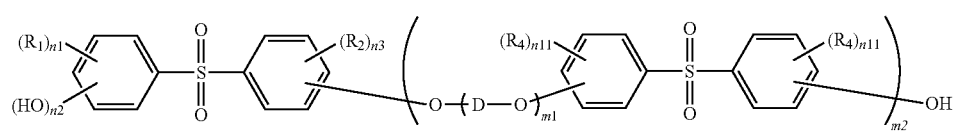

(VII)

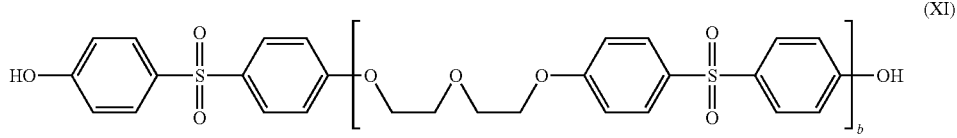

(in formula (XI), b represents any integer of 1 to 6)

In the above, as the halogen atom, a fluorine atom, a chlorine atom, a bromine atom, an iodine atom or the like may be exemplified. As the $C_1$ to $C_6$ alkyl group, for example, a methyl group, an ethyl group, a n-propyl group, an i-propyl group, a n-butyl group, an s-butyl group, an i-butyl group, a t-butyl group, a n-pentyl group or n-hexyl group may be exemplified. As the $C_1$ to $C_6$ alkoxy group, for example, a methoxy group, an ethoxy group, a n-propoxy group, an i-propoxy group, a n-butoxy group, an s-butoxy group, an i-butoxy group or a t-butoxy group may be exemplified. As the $C_2$ to $C_6$ alkenyl group, for example, a vinyl group, a 1-propenyl group, a 2-propenyl group, a 1-butenyl group, a 2-butenyl group, a 3-butenyl group, a 1-methyl-2-propenyl group, a 2-methyl-2-propenyl group, a 1-pentenyl group, a 2-pentenyl group, a 3-pentenyl group, a 4-pentenyl group, a 1-methyl-2-butenyl group, a 2-methyl-2-butenyl group, a 1-hexenyl group, a 2-hexenyl group, a 3-hexenyl group, a 4-hexenyl group or a 5-hexenyl group may be exemplified. As the $C_1$ to $C_6$ haloalkyl group, which is an alkyl group substituted by a halogen atom, for example, a chloromethyl group, a bromomethyl group, a fluoromethyl group, a trifluoromethyl group, a trichloromethyl group, a tribromomethyl group, a 2,2,2-trichloroethyl group, a 2,2,3,3,3-pentafluoropropyl group or a 1-chlorobutyl group, a 6-fluorohexyl group, a 6,6,6-trifluorohexyl group may be exemplified. As the $C_2$ to $C_6$ haloalkenyl group, which is an alkenyl group hydrogen atoms of which are partly or wholly substituted by halogen atoms, for example, a 2-fluorovinyl group, a 2-chlorovinyl group, a 2,2-difluorovinyl group, a 1,2-difluorovinyl group, a 3-bromoallyl group, a 3,3-fluoroallyl group, a 4,4,4-trifluoro-1-butenyl group, a 5,5,5-trifluoro-1-pentenyl group or a 6,6,6-trifluoro-1-hexenyl group may be exemplified. As the aralkyl group, for example, a benzyl group, a phenethyl group, a 3-phenyl-n-propyl group, a 1-phenyl-n-hexyl group, a naphthalen-1-ylmethyl group, a naphthalen-2-ylethyl group, a 1-naphthalen-2-yl-n-propyl group or an inden-1-ylmethyl group may be exemplified. As the linear or branched $C_1$ to $C_{12}$ hydrocarbon group, for example, a methyl group, an ethyl group, a n-propyl group, an i-propyl group, a n-butyl group, an s-butyl group, an i-butyl group, a t-butyl group, a n-pentyl group, a n-hexyl group, a nonyl group, an isononyl group, a decyl group or a lauryl group may be exemplified. As the cyclic $C_1$ to $C_{12}$ hydrocarbon group, which is, for example, a monocyclic or polycyclic alkyl group, for example, a cyclopropyl group, a cyclobutyl group, a cyclopentyl group, a cyclohexyl group, a cycloheptyl group, a cyclooctyl group, a cyclododecyl group, a bicyclooctyl group, a bicycloheptyl group, a norbornyl group or an adamantyl group may be exemplified. Preferably, a C3-8 cycloalkyl group is mentioned. As the aryl group, for example, a phenyl group or a naphthyl group may be exemplified.

In the recording material (1), the ratio of a color-developing agent of component (C) to be used is usually 0.01 to 10 parts by mass, preferably 0.5 to 10 parts by mass, and more preferably 1.0 to 5 parts by mass, with respect to 1 part by mass of the color former.

In the recording material (1), the ratio of a compound represented by formula (I) to be used is usually 0.01 to 10 parts by mass, preferably 0.1 to 2 parts by mass, and more preferably 0.2 to 1 part by mass, with respect to 1 part by mass of the color developing agent.

(Recording Material (2))

The recording material (2) is a recording material characterized by containing (A) at least one color former, (B) a compound represented by the above formula (X) and (C) at least one color-developing agent.

In formula (X), as X and Y, the same as in formula (I) may be exemplified.

Among the compounds represented by formula (X), 2-methylbenzhydrol is preferable.

As the color former to be used in the recording material (2), the same as in the recording material (1) may be exemplified.

The color-developing agent to be used in the recording material (2) is not particularly limited; however, at least one compound of the compounds represented by the above formula (II), formula (III), formula (IV), formula (V), formula (VI) or Formula (VII). As these compounds, the same as in the recording material (1) may be exemplified.

Among them, as a compound represented by formula (II), 4,4'-BPS, D-8 and D-90 are preferable.

In the recording material (2), the ratio of the color-developing agent to be used is usually 0.01 to 10 parts by mass, preferably 0.5 to 10 parts by mass, and more preferably 1.0 to 5 parts by mass, with respect to 1 part by mass of the color former.

In the recording material (2), the ratio of a compound represented by formula (X) to be used is usually 0.01 to 10 parts by mass, preferably 0.1 to 2 parts by mass, and more preferably 0.2 to 1 part by mass, with respect to 1 part by mass of the color developing agent.

(Other Components in the Recording Material)

In the recording material of the present invention, other than a compound represented by formula (I) or formula (X), a color former and a compound serving as a color-developing agent, one or more agents known in the art such as a color-developing agent (different type of color-developing agent from the above), a sensitizer (different type of color-developing agent from the above), an image stabilizer, a filler, a dispersant, an antioxidant, an anti-adhesive agent, a defoaming agent, a light stabilizer and a fluorescent whitening agent known in the art may be contained as necessary. The amount of each of the components except the color former relative to the color former (1 part by mass) usually falls within the range of 0.1 to 15 parts by mass and preferably 1 to 10 parts by mass.

These chemical agents may be contained in a color developing layer. In case of a multi-layer structure, more specifically, in case where the color developing layer has an overcoat layer and/or an undercoat layer on and/or under the color forming layer, these chemical agents may be contained in these layers. Furthermore, if necessary, an antioxidant and a light stabilizer may be encapsulated in microcapsules and then added to these layers.

As the specific examples of the different type of color-developing agents, the following ones may be exemplified. Bisphenol compounds such as bisphenol A, 4,4'-sec-butylidenebisphenol, 4,4'-cyclohexylidenebisphenol, 2,2'-bis(4-hydroxyphenyl)-3,3'-dimethylbutane, 2,2'-dihydroxydiphenyl, pentamethylene-bis(4-hydroxybenzoate), 2,2-dimethyl-3,3-di(4-hydroxyphenyl)pentane, 2,2-di(4-hydroxyphenyl) hexane, 2,2-bis(4-hydroxyphenyl)propane, 2,2-bis(4-hydroxyphenyl)butane, 2,2-bis(4-hydroxy-3-methylphenyl) propane, 4,4'-(1-phenylethylidene)bisphenol, 4,4'-ethylidenebisphenol, (hydroxyphenyl)methylphenol, 2,2'-bis(4-hydroxy-3-phenyl-phenyl)propane, 4,4'-(1,3-phenylenediisopropylidene)bisphenol, 4,4'-(1,4-phenylenediisopropylidene)bisphenol, and butyl 2,2-bis(4-hydroxyphenyl)acetate; sulfur-containing bisphenol compounds such as 4,4'-dihydroxydiphenyl thioether, 1,7-di(4-hydroxyphenylthio)-3,5-dioxaheptane, 2,2'-bis(4-hydroxyphenylthio)diethyl ether, and 4,4'-dihydroxy-3,3'-dimethyldiphenyl thioether; 4-hydroxybenzoic acid esters such as benzyl 4-hydroxybenzoate, ethyl 4-hydroxybenzoate, propyl 4-hydroxybenzoate, isopropyl 4-hydroxybenzoate, butyl 4-hydroxybenzoate, isobutyl 4-hydroxybenzoate, chlorobenzyl 4-hydroxybenzoate, methylbenzyl 4-hydroxybenzoate, and diphenylmethyl 4-hydroxybenzoate; metal salts of benzoic acid such as zinc benzoate and zinc 4-nitrobenzoate; salicylic acids such as 4-[2-(4-methoxyphenyloxy)ethyloxy]salicylic acid; metal salts of salicylic acid such as zinc salicylate and zinc bis[4-(octyloxycarbonylamino)-2-hydroxybenzoate]; 4-hydroxyphthalic acid diesters such as dimethyl 4-hydroxyphthalate, dicyclohexyl 4-hydroxyphthalate and diphenyl 4-hydroxyphthalate; hydroxynaphthoic acid esters such as 2-hydroxy-6-carboxynaphthalene; trihalomethylsulfones such as tribromomethylphenylsulfone; hydroxyacetophenone, p-phenylphenol, benzyl 4-hydroxyphenylacetate, p-benzylphenol, hydroquinone-monobenzyl ether, 2,4-dihydroxy-2'-methoxybenzanilide, tetracyanoquinodimethanes, N-(2-hydroxyphenyl)-2-[(4-hydroxyphenyl)thio]acetamide, N-(4-hydroxyphenyl)-2-[(4-hydroxyphenyl)thio]acetamide, 4-hydroxybenzenesulfonanilide, 4'-hydroxy-4-methylbenzenesulfonanilide, 4,4'-bis((4-methyl-3-phenoxycarbonyl) aminophenylureido)diphenylsulfone, 3-(3-phenylureido) benzenesulfonanilide, octadecylphosphoric acid, dodecylphosphoric acid or the like may be exemplified.

As the specific examples of the different type of sensitizer, the following ones may be exemplified.

Higher fatty acid amides such as stearic acid amide, stearic acid anilide, and palmitic acid amide; amides such as benzamide, acetoacetanilide, thioacetanilide acrylic acid amide, ethylenebisamide, ortho-toluenesulfonamide and para-toluenesulfonamide; phthalic acid diesters such as dimethyl phthalate, dibenzyl isophthalate, dimethyl isophthalate, dimethyl terephthalate, diethyl isophthalate, diphenyl isophthalate and dibenzyl terephthalate; oxalic acid diesters such as dibenzyl oxalate, di(4-methylbenzyl) oxalate, di(4-chlorobenzyl) oxalate, a mixture of dibenzyl oxalate and di(4-chlorobenzyl) oxalate in equal amounts, a mixture of di(4-chlorobenzyl) oxalate and di(4-methylbenzyl) oxalate in equal amounts; bis(t-butylphenols) such as 2,2'-methylenebis(4-methyl-6-t-butylphenol) and 4,4'-methylene-bis-2,6-di-t-butylphenol; 1,2-bis(phenoxy)ethane, 1,2-bis(4-methylphenoxy)ethane, 1,2-bis(3-methylphenoxy)ethane, 1,2-bis (phenoxymethyl)benzene, 1,2-bis(4-methoxyphenylthio) ethane, 1,2-bis(4-methoxyphenoxy)propane, 1,3-phenoxy-2-propanol, 1,4-diphenylthio-2-butene, 1,4-diphenylthiobutane, 1,4-diphenoxy-2-butene, 1,5-bis(4-methoxyphenoxy)-3-oxapentane, 1,3-dibenzoyloxypropane, dibenzoyloxymethane, 4,4'-ethylenedioxy-bis-benzoic acid dibenzyl ester, bis[2-(4-methoxy-phenoxy)ethyl] ether, 2-naphthylbenzyl ether, 1,3-bis(2-vinyloxyethoxy)benzene, 1,4-diethoxynaphthalene, 1,4-dibenzyloxynaphthalene, 1,4-dimethoxynaphthalene, 1,4-bis(2-vinyloxyethoxy)benzene, p-(2-vinyloxyethoxy)biphenyl, p-aryloxybiphenyl, p-propargyloxybiphenyl, p-benzyloxybenzyl alcohol, 4-(m-methylphenoxymethyl)biphenyl, 4-methylphenyl-biphenyl ether, di-β-naphthylphenylenediamine, diphenylamine, carbazole, 2,3-di-m-tolylbutane, 4-benzylbiphenyl or 4,4'-dimethylbiphenyl; a terphenyl such as m-terphenyl, and p-terphenyl; 1,2-bis(3,4-dimethylphenyl)ethane, 2,3,5,6-tetramethyl-4'-methyldiphenylmethane, 4-acetylbiphenyl, dibenzoylmethane, triphenylmethane, phenyl 1-hydroxy-naphthoate, methyl 1-hydroxy-2-naphthoate, N-octadecylcarbamoyl-p-methoxycarbonylbenzene, benzyl p-benzyloxybenzoate, phenyl β-naphthoate, methyl nitrobenzoate and diphenyl sulfone; carbonic acid derivatives such as diphenyl carbonate, guaiacol carbonate, di-p-tolyl carbonate and phenyl-α-naphthyl carbonate; N-octadecylcarbamoylbenzene, dibenzyl disulfide, stearic acid, amide AP-1 (a mixture of stearic acid amide and palmitic acid amide in a ratio of 7:3); a stearate such as aluminum stearate, calcium stearate and zinc stearate; zinc palmitate, behenic acid, zinc behenate, montanic acid wax, polyethylene wax or the like may be exemplified.

As the image stabilizer, for example, epoxy group-containing diphenylsulfones such as 4-benzyloxy-4'-(2-methylglycidyloxy)-diphenylsulfone, and 4,4'-diglycidyloxydiphenylsulfone; 1,4-diglycidyloxybenzene, 4-[α-(hydroxymethyl)benzyloxy]-4'-hydroxydiphenylsulfone, 2-propanol derivatives, salicylic acid derivatives, metal salts of oxynaphthoic acid derivatives (particularly a zinc salts), metal salts of 2,2-methylenebis(4,6-t-butylphenyl) phosphate, water-insoluble zinc compounds other than the above zinc compounds; hindered phenol compounds such as 2,2-bis(4'-hydroxy-3',5'-dibromophenyl)propane, 4,4'-sulfonylbis(2,6-dibromophenol), 4,4'-butylidene (6-t-butyl-3-methylphenol), 2,2'-methylene-bis(4-methyl-6-t-butylphenol), 2,2'-methylene-bis(4-ethyl-6-t-butylphenol), 2,2'-di-t-butyl-5,5'-dimethyl-4,4'-sulfonyldiphenol, 1,1,3-tris(2-methyl-4-hydroxy-5-cyclohexylphenyl)butane or 1,1,3-tris(2-methyl-4-hydroxy-5-t-butylphenyl)butane; phenol novolak compounds, epoxy resins, or UU (color-developing agent manufactured by CHEMIPRO KASEI) may be exemplified.

Note that, the image stabilizer is preferably a compound being solid at normal temperature and particularly preferably a compound having a melting point of 60° C. or more and being less soluble in water.

As the filler, for example, silica, clay, kaolin, calcined kaolin, talc, satin white, aluminum hydroxide, calcium carbonate, magnesium carbonate, zinc oxide, titanium oxide, barium sulfate, magnesium silicate, aluminum silicate, plastic pigment, diatomaceous earth, talc or aluminum hydroxide may be exemplified. Among these, calcined kaolin or calcium carbonate may be suitably exemplified. The ratio of the filler to be used is 0.1 to 15 parts by mass relative to the color former (1 part by mass) and preferably 1 to 10 parts by mass. Alternatively, the above fillers may be used as a mixture.

As the dispersant, for example, polyvinyl alcohol; a polyvinyl alcohol such as acetoacetylated polyvinyl alcohol, carboxy modified polyvinyl alcohol, sulfonic acid modified polyvinyl alcohol, amide modified polyvinyl alcohol, butyral modified vinyl alcohol, which differs in saponification degree and polymerization degree; cellulose derivatives such as methylcellulose, carboxymethylcellulose, hydroxy-ethylcellulose, ethylcellulose, acetylcellulose and hydroxymethylcellulose; sodium polyacrylate, polyacrylic acid ester, polyacrylamide, starch; sulfosuccinate esters such as dioctyl sodium sulfosuccinate; sodium dodecylbenzene sulfonate, sodium salts of lauryl alcohol sulfuric acid ester, fatty acid salt, styrene-maleic anhydride copolymers, styrene-butadiene copolymers, polyvinyl chloride, polyvinyl acetate, polyacrylic acid ester, polyvinyl butyral, polyurethane, polystyrene and copolymers thereof, polyamide resins, silicone resins, petroleum resins, terpene resins, ketone resins or coumarone resins may be exemplified.

The dispersant is dissolved in a solvent such as water, an alcohol, a ketone, an ester or a hydrocarbon and then put in use or may be emulsified or dispersed like a paste in water or another solvent and then put in use.

As the antioxidant, for example, 2,2'-methylenebis(4-methyl-6-t-butylphenol), 2,2'-methylenebis(4-ethyl-6-t-butylphenol), 4,4'-propyl methylenebis(3-methyl-6-t-butylphenol), 4,4'-butylidenebis(3-methyl-6-t-butylphenol), 4,4'-thiobis(2-t-butyl-5-methylphenol), 1,1,3-tris(2-methyl-4-hydroxy-5-t-butylphenyl)butane, 1,1,3-tris(2-methyl-4-hydroxy-5-cyclohexylphenyl)butane, 4-{4-[1,1-bis(4-hydroxyphenyl)ethyl]-α,α-dimethylbenzyl}phenol, 1,1,3-tris(2-methyl-4-hydroxy-5-cyclohexylphenyl)butane, 2,2'-methylenebis(6-tert-butyl-4-methylphenol), 2,2'-methylenebis(6-tert-butyl-4-ethylphenol), 4,4'-thiobis(6-tert-butyl-3-methylphenol), 1,3,5-tris[{4-(1,1-dimethylethyl)-3-hydroxy-2,6-dimethylphenyl}methyl]-1,3,5-triazine-2,4,6(1H, 3H, 5H)-trione, or 1,3,5-tris[{3,5-bis(1,1-dimethylethyl)-4-hydroxyphenyl}methyl]-1,3,5-triazine-2,4,6(1H,3H,5H)-trione may be exemplified.

As the anti-adhesive agent, for example, stearic acid, zinc stearate, calcium stearate, carnauba wax, paraffin wax or ester wax may be exemplified.

As the antifoaming agent, for example, a higher alcohol based antifoaming agent, a fatty acid ester based antifoaming agent, an oil based antifoaming agent, a silicone based antifoaming agent, a polyether based antifoaming agent, a modified hydrocarbon based antifoaming agent or a paraffin based antifoaming agent may be exemplified.

As the light stabilizer, for example, a UV absorber based on a salicylic acid such as phenyl salicylate, p-t-butylphenyl salicylate, and p-octylphenyl salicylate; a UV absorber based on benzophenone such as 2,4-dihydroxybenzophenone, 2-hydroxy-4-methoxybenzophenone, 2-hydroxy-4-benzyloxybenzophenone, 2-hydroxy-4-octyloxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone, and bis(2-methoxy-4-hydroxy-5-benzoylphenyl) methane; an UV absorber based on benzotriazole such as 2-(2'-hydroxy-5'-methylphenyl)benzotriazole, 2-(2'-hydroxy-5'-t-butylphenyl)benzotriazole, 2-(2'-hydroxy-3',5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-(2'-hydroxy-5'-tert-butylphenyl)benzotriazole, 2-(2'-hydroxy-5'-(1",1",3",3"-tetramethylbutyl)phenyl)benzotriazole, 2-[(2'-hydroxy-3'-(3",4",5",6"-tetrahydrophthalimidomethyl)-5'-methylphenyl]benzotriazole, 2-(2'-hydroxy-5'-t-octylphenyl)benzotriazole, 2-[2'-hydroxy-3',5'-bis(α,α-dimethylbenzyl)phenyl]-2H-benzotriazole, 2-(2'-hydroxy-3'-dodecyl-5'-methylphenyl)benzotriazole, 2-(2'-hydroxy-3'-undecyl-5'-methylphenyl)benzotriazole, 2-(2'-hydroxy-3'-tridecyl-5'-methylphenyl)benzotriazole, 2-(2'-hydroxy-3'-tetradecyl-5'-methylphenyl)benzotriazole, 2-(2'-hydroxy-3'-pentadecyl-5'-methylphenyl)benzotriazole, 2-(2'-hydroxy-3'-hexadecyl-5'-methylphenyl)benzotriazole, 2-[2'-hydroxy-4'-(2"-ethylhexyl)oxyphenyl]benzotriazole, 2-[2'-hydroxy-4'-(2"-ethylheptyl)oxyphenyl]benzotriazole, 2-[2'-hydroxy-4'-(2"-ethyloctyl)oxyphenyl]benzotriazole, 2-[2'-hydroxy-4'-(2"-propyloctyl)oxyphenyl]benzotriazole, 2-[2'-hydroxy-4'-(2"-propylheptyl)oxyphenyl]benzotriazole, 2-[2'-hydroxy-4'-(2"-propylhexyl)oxyphenyl]benzotriazole, 2-[2'-hydroxy-4'-(1"-ethylhexyl)oxyphenyl]benzotriazole, 2-[2'-hydroxy-4'-(1"-ethylheptyl)oxyphenyl]benzotriazole, 2-[2'-hydroxy-4'-(1'-ethyloctyl)oxyphenyl]benzotriazole, 2-[2'-hydroxy-4'-(1"-propyloctyl)oxyphenyl]benzotriazole, 2-[2'-hydroxy-4'-(1"-propylheptyl)oxyphenyl]benzotriazole, 2-[2'-hydroxy-4'-(1"-propylhexyl)oxyphenyl]benzotriazole, 2,2'-methylenebis[4-(1,1,3,3-tetramethylbutyl)-6-(2H-benzotriazol-2-yl)]phenol, and a condensation product between polyethylene glycol and methyl-3-[3-t-butyl-5-(2H-benzotriazol-2-yl)-4-hydroxyphenyl] propionate; a UV absorber based on cyanoacrylate such as 2'-ethylhexyl-2-cyano-3,3-diphenylacrylate and ethyl-2-cyano-3,3-diphenylacrylate; a UV absorber based on hindered amine such as bis(2,2,6,6-tetramethyl-4-piperidyl) sebacate, bis(2,2,6,6-tetramethyl-4-piperidyl) succinate and bis(1,2,2,6,6-pentamethyl-4-piperidyl) 2-(3,5-di-t-butyl)malonate; or 1,8-dihydroxy-2-acetyl-3-methyl-6-methoxynaphthalene may be exemplified.

As the fluorescent brightener, for example, 4,4'-bis[2-anilino-4-(2-hydroxyethyl)amino-1,3,5-triazinyl-6-amino]stilbene-2,2'-disulfonic acid disodium salt, 4,4'-bis[2-anilino-4-bis(hydroxyethyl)amino-1,3,5-triazinyl-6-amino]stilbene-2,2'-disulfonic acid disodium salt, 4,4'-bis[2-anilino-4-bis(hydroxypropyl)amino-1,3,5-triazinyl-6-amino]stilbene-2,2'-disulfonic acid disodium salt, 4,4'-bis[2-methoxy-4-(2-hydroxyethyl)amino-1,3,5-triazinyl-6-amino]stilbene-2,2'-disulfonic acid disodium salt, 4,4'-bis[2-methoxy-4-(2-hydroxypropyl)amino-1,3,5-triazinyl-6-amino]stilbene-2,2'-disulfonic acid disodium salt, 4,4'-bis[2-m-sulfoanilino-4-bis(hydroxyethyl)amino-1,3,5-triazinyl-6-amino]stilbene-2,2'-disulfonic acid disodium salt, 4-[2-p-sulfoanilino-4-bis(hydroxyethyl)amino-1,3,5-triazinyl-6-amino]-4'-[2-m-sulfoanilino-4-bis(hydroxyethyl)amino-1,3,5-triazinyl-6-amino]stilbene-2,2'-disulfonic acid tetrasodium salt, 4,4'-bis[2-p-sulfoanilino-4-bis(hydroxyethyl)amino-1,3,5-triazinyl-6-amino]stilbene-2,2'-disulfonic acid tetrasodium salt, 4,4'-bis[2-(2,5-disulfoanilino)-4-phenoxyamino-1,3,5-triazinyl-6-amino]stilbene-2,2'-disulfonic acid hexasodium salt 4,4'-bis[2-(2,5-disulfoanilino)-4-(p-methoxycarbonylphenoxy)amino-1,3,5-triazinyl-6-amino]stilbene-2,2'-disulfonic acid hexasodium salt, 4,4'-bis[2-(p-sulfophenoxy)-4-bis(hydroxyethyl)amino-1,3,5-triazinyl-6-amino]stilbene-2,2'-disulfonic acid hexasodium salt, 4,4'-bis[2-(2,5-disulfoanilino)-4-formalinylamino-1,3,5-triazinyl-6-amino]stilbene-2,2'-disulfonic acid hexasodium salt, or 4,4'-bis[2-(2,5-disulfoanilino)-4-bis(hydroxyethyl)amino-1,3,5-triazinyl-6-amino]stilbene-2,2'-disulfonic acid hexasodium salt may be exemplified.

(Recording Sheet)

The recording sheet of the present invention is a recording sheet having a recording material layer formed of any one of recording materials mentioned above.

In the recording sheet of the present invention, a compound represented by formula (I) or formula (X) is contained in a color developing layer containing a color former and a color-developing agent.

In the recording sheet of the present invention, as a compound represented by formula (I), the same as exemplified above as the Component (B) may be exemplified.

Among them, 1,1-diphenylethanol and a compound represented by formula (X) may be preferably mentioned. Among the compounds represented by formula (X), 2-methylbenzhydrol is particularly preferable.

As the recording sheet of the present invention, a thermal recording paper, a pressure-sensitive copying paper or the like may be exemplified and preferably a thermal recording paper may be mentioned. In the case where the recording sheet of the present invention is used as a thermal recording paper, the recoding sheet may be used in the same manner as known in the art. For example, a thermal recording paper may be produced by dispersing fine particles of a compound represented by formula (I) or formula (X) in an aqueous solution of a water-soluble binder such as polyvinyl alcohol and cellulose to prepare a suspension solution, blending suspension solutions separately dispersing fine particles of a color former and color-developing agent with the suspension solution obtained above, applying the mixture onto a support made of e.g., paper, and drying the support.

As the support to be used in the recording sheet of the present invention, paper, synthetic paper, recycled paper such as waste-paper pulp, film, plastic film, foamed plastic film, nonwoven fabric conventionally known or the like may be used. These may be used in combination as a support. Among them, paper is preferably used as a support. The thickness of the support, which is not particularly limited, is usually about 1 to 500 μm.

In the case where paper is used as a support, a dispersion solution containing a color former dispersion solution, a color-developing agent dispersion solution, a sensitizer dispersion solution and a filler dispersion solution may be directly applied to the paper; however, a dispersion solution for an undercoat layer is applied in advance and dried, and thereafter, the aforementioned dispersion solution may be applied. Preferably, the dispersion solution for an undercoat layer is applied, and then, the aforementioned dispersion solution is applied. This is because good color-developing sensitivity is obtained.

The dispersion solution for an undercoat layer is used in order to improve the surface smoothness of a support and particularly not limited; however, a filler, a dispersant and water are preferably contained. Specifically, as the filler, e.g., calcined kaolin or calcium carbonate is preferable. As the dispersant, e.g., polyvinyl alcohol is preferable.

When a recording material layer is formed on a support, a method of applying a dispersion solution containing a dye dispersion solution, a color-developing agent dispersion solution, a sensitizer dispersion solution and a filler dispersion solution to the support and drying the support is preferable. Other than this, a method of applying the dispersion solution by e.g., spraying followed by drying and a method of soaking a support in a dispersion solution for a predetermined time, followed by drying or the like may be exemplified. For applying the dispersion solution, a hand coating method, a size press coater method, a roll coater method, an air knife coater method, a blend coater method, a blow coater method, a curtain coater method, a comma direct method, a gravure direct method, a gravure reverse method, a reverse roll coater method or the like may be exemplified. The application amount, which varies depending upon the concentration of a recording material dispersion solution, is usually 0.1 to 100 g/m² and preferably 1 to 20 g/m² on a dry-mass basis.

EXAMPLES

Now, the recording material of the present invention will be more specifically described by way of Examples; however, the present invention is not limited merely to these.

Note that, as calcined kaolin, Ansilex (registered trademark)-93 was used. With respect to the compounds, the names or structures of which are shown below, the following abbreviations are used.

1,1-Diphenylethanol, abbreviation: DPE
2-Methylbenzhydrol, abbreviation: MBH
1,2-bis(phenoxy)ethane, abbreviation: EGPE
4-Hydroxy-4'-isopropoxydiphenyl sulfone, abbreviation: D-8
4,4'-Dihydroxydiphenyl sulfone, abbreviation: 4,4'-BPS

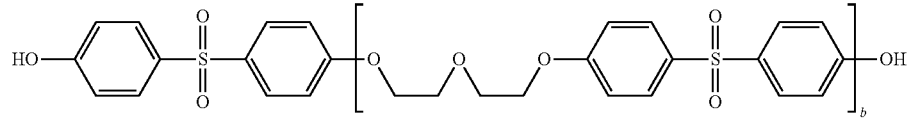

(wherein b is any integer of 1 to 6)

A mixture of diphenyl sulfone crosslinked compounds represented by above formula, abbreviation: D-90

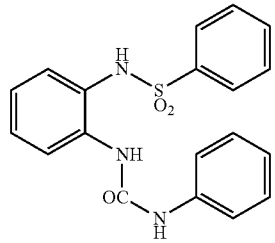

Abbreviation: color developing agent 1

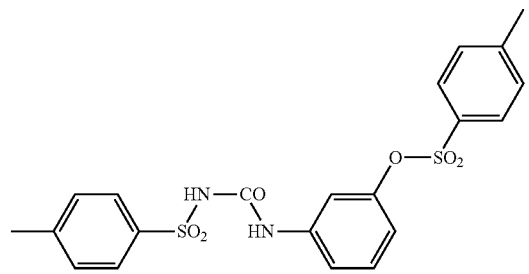

Abbreviation: P-201

Preparation and Test of Thermal Recording Paper

1) Preparation of Thermal Recording Paper

Examples 1 to 10, Comparative Examples 2, 4, 6, 8, 10

Dye Dispersion Solution (Solution A)

| | |
|---|---|
| 3-di-n-Butylamino-6-methyl-7-anilinofluoran | 16 parts |
| 10% Aqueous polyvinyl alcohol solution | 84 parts |

Color-Developing Agent Dispersion Solution (Solution B)

| Color-developing agent | 16 parts |
|---|---|
| 10% Aqueous polyvinyl alcohol solution | 84 parts |

Filler Dispersion Solution (Solution C)

| Calcined kaolin | 27.8 parts |
|---|---|
| 10% Aqueous polyvinyl alcohol solution | 26.2 parts |
| Water | 71 parts |

Sensitizer Dispersion Solution (Solution D)

| Sensitizer | 16 parts |
|---|---|
| 10% Aqueous polyvinyl alcohol solution | 84 parts |

("parts" represents "parts by mass")

Each mixture having the composition of the solutions A to D was sufficiently ground with a sand grinder to prepare dispersion solutions of the components of the solutions A to D. 1 part by mass of the solution A, 2 parts by mass of the solution B, 3 parts by mass of the solution C, and 1 part by mass of the solution D were mixed to prepare a coating solution for a color developing layer. To a white paper-sheet, first, Solution C was applied by use of a wire rod (wire bar NO. 12, manufactured by Webster) and dried to prepare an undercoat layer. Subsequently, the coating solution for a color developing layer was applied on the undercoat layer by use of a wire rod and dried, and then calendering treatment was applied to prepare a thermal recording paper (the coating solution for a color developing layer: about 5.5 g/m² on a dry-mass basis).

Comparative Examples 1, 3, 5, 7, 9

Dye Dispersion Solution (Solution A)

| 3-di-n-Butylamino-6-methyl-7-anilinofluoran | 16 parts |
|---|---|
| 10% Aqueous polyvinyl alcohol solution | 84 parts |

Color-Developing Agent Dispersion Solution (Solution B)

| Color-developing agent | 16 parts |
|---|---|
| 10% Aqueous polyvinyl alcohol solution | 84 parts |

Filler Dispersion Solution (Solution C)

| Calcined kaolin | 27.8 parts |
|---|---|
| 10% Aqueous polyvinyl alcohol solution | 26.2 parts |
| Water | 71 parts |

("parts" represents "parts by mass")

Each mixture having the composition of the solutions A to C was sufficiently ground with a sand grinder to prepare dispersion solutions of the components of the solutions A to C. 1 part by mass of the solution A, 2 parts by mass of the solution B and 4 parts by mass of the solution C were mixed to prepare a coating solution for a color developing layer. To a white paper-sheet, first, Solution C was applied by use of a wire rod (wire bar NO. 12, manufactured by Webster) and dried to prepare an undercoat layer. Subsequently, the coating solution for a color developing layer was applied on the undercoat layer by use of a wire rod and dried, and then calendering treatment was applied to prepare a thermal recording paper (the coating solution for a color developing layer: about 5.5 g/m² on a dry-mass basis).

The (correspondence) relationship between evaluation samples, color-developing agent and sensitizer is shown in Table 1.

In the following tests, Comparative Examples were carried out for comparing each of two types of sensitizers used in Examples.

TABLE 1

List of evaluation samples

| Evaluation sample | Color-developing agent | Sensitizer |
|---|---|---|
| Comparative Example 1 | Color-developing agent 1 | — |
| Comparative Example 2 | Color-developing agent 1 | EGPE |
| Example 1 | Color-developing agent 1 | DPE |
| Example 2 | Color-developing agent 1 | MBH |
| Comparative Example 3 | D-8 | — |
| Comparative Example 4 | D-8 | EGPE |
| Example 3 | D-8 | DPE |
| Example 4 | D-8 | MBH |
| Comparative Example 5 | D-90 | — |
| Comparative Example 6 | D-90 | EGPE |
| Example 5 | D-90 | DPE |
| Example 6 | D-90 | MBH |
| Comparative Example 7 | P-201 | — |
| Comparative Example 8 | P-201 | EGPE |
| Example 7 | P-201 | DPE |
| Example 8 | P-201 | MBH |
| Comparative Example 9 | 4,4'-BPS | — |
| Comparative Example 10 | 4,4'-BPS | EGPE |
| Example 9 | 4,4'-BPS | DPE |
| Example 10 | 4,4'-BPS | MBH |

2) Dynamic Color-Developing Sensitivity Test

Each thermal recording paper was partly cut out and subjected to a dynamic color-developing sensitivity test using a thermo-sensitive paper color development test machine (trade name: TH-PMH type, manufactured by OHKURA-DENKI). Color was developed in both conditions: printing voltage of 17 V, pulse widths of 0.95 ms and 1.25 ms and then the print densities were measured by Macbeth reflection densitometer (filter used herein: #106).

The results of the above test are shown in Tables 2-1 and 2-2.

TABLE 2-1

| Evaluation sample | Dynamic color-developing sensitivity | |
|---|---|---|
| | 0.95 ms | 1.25 ms |
| Comparative Example 1 | 0.67 | 1.10 |
| Comparative Example 2 | 1.19 | 1.27 |

TABLE 2-1-continued

| Evaluation sample | Dynamic color-developing sensitivity | |
|---|---|---|
| | 0.95 ms | 1.25 ms |
| Example 1 | 1.19 | 1.28 |
| Comparative Example 3 | 1.01 | 1.25 |
| Comparative Example 4 | 1.27 | 1.28 |
| Example 3 | 1.23 | 1.28 |
| Comparative Example 5 | 0.52 | 0.89 |
| Comparative Example 6 | 0.96 | 1.15 |
| Example 5 | 0.94 | 1.13 |
| Comparative Example 7 | 0.66 | 1.09 |
| Comparative Example 8 | 1.19 | 1.26 |
| Example 7 | 1.18 | 1.29 |
| Comparative Example 9 | 0.63 | 1.05 |
| Comparative Example 10 | 1.10 | 1.29 |
| Example 9 | 1.09 | 1.30 |

TABLE 2-2

| Evaluation sample | Dynamic color-developing sensitivity | |
|---|---|---|
| | 0.95 ms | 1.25 ms |
| Comparative Example 1 | 0.41 | 0.84 |
| Comparative Example 2 | 0.94 | 1.24 |
| Example 2 | 0.89 | 1.20 |
| Comparative Example 3 | 0.76 | 1.14 |
| Comparative Example 4 | 1.16 | 1.31 |
| Example 4 | 1.10 | 1.26 |
| Comparative Example 5 | 0.28 | 0.60 |
| Comparative Example 6 | 0.65 | 0.97 |
| Example 6 | 0.68 | 0.94 |
| Comparative Example 7 | 0.41 | 0.86 |
| Comparative Example 8 | 1.00 | 1.24 |
| Example 8 | 0.94 | 1.22 |
| Comparative Example 9 | 0.35 | 0.72 |
| Comparative Example 10 | 0.62 | 1.07 |
| Example 10 | 0.78 | 1.15 |

From the results of Tables 2-1 and 2-2, it was found that the recording sheet of the present invention produces an equivalent sensitization effect compared to the case where EGPE was used as a sensitizer, and that particularly in the case where 4,4'-BPS is used as a color-developing agent, MBH exerts a further more excellent sensitization effect than EGPE.

3) Storage Stability Test for Background

With respect to individual evaluation samples, the test sheets before and after the test were subjected to a storage stability test in the following conditions. The results were shown in Tables 3-1 and 3-2.

[Before Test]

Each thermal recording paper was partly cut out and optical density of the background was measured by a Macbeth reflection densitometer (filter used herein: #106).

[Heat Resistance Test]

Each thermal recording paper was partly cut out and stored in an incubator (trade name: DK-400, manufactured by YAMATO) of 80° C., 90° C. or 100° C. for 24 hours. After storage, the optical density of the background was measured by a Macbeth reflection densitometer (filter used herein: #106).

[Water Resistance Test]

Each thermal recording paper was partly cut out and soaked in water at 25° C. for 7 days. Thereafter, the optical density of the background was measured by a Macbeth reflection densitometer (filter used herein: #106).

TABLE 3-1

| Evaluation sample | Before test | Background heat resistance | | | Background water resistance |
|---|---|---|---|---|---|
| | | 80° C. | 90° C. | 100° C. | |
| Comparative Example 1 | 0.06 | 0.08 | 0.11 | 0.12 | 0.04 |
| Comparative Example 2 | 0.04 | 0.12 | 0.18 | 0.24 | 0.03 |
| Example 1 | 0.05 | 0.13 | 0.15 | 0.15 | 0.03 |
| Comparative Example 3 | 0.06 | 0.14 | 0.20 | 0.32 | 0.03 |
| Comparative Example 4 | 0.07 | 0.27 | 0.52 | 0.70 | 0.02 |
| Example 3 | 0.08 | 0.30 | 0.30 | 0.39 | 0.02 |
| Comparative Example 5 | 0.05 | 0.07 | 0.21 | 0.45 | 0.05 |
| Comparative Example 6 | 0.04 | 0.16 | 0.36 | 0.65 | 0.04 |
| Example 5 | 0.05 | 0.29 | 0.31 | 0.44 | 0.05 |
| Comparative Example 7 | 0.08 | 0.12 | 0.16 | 0.21 | 0.05 |
| Comparative Example 8 | 0.07 | 0.20 | 0.32 | 0.36 | 0.03 |
| Example 7 | 0.07 | 0.18 | 0.21 | 0.21 | 0.04 |
| Comparative Example 9 | 0.10 | 0.13 | 0.18 | 0.19 | 0.02 |
| Comparative Example 10 | 0.09 | 0.16 | 0.21 | 0.27 | 0.02 |
| Example 9 | 0.08 | 0.15 | 0.18 | 0.21 | 0.02 |

TABLE 3-2

| Evaluation sample | Before test | Background heat resistance | | | Background water resistance |
|---|---|---|---|---|---|
| | | 80° C. | 90° C. | 100° C. | |
| Comparative Example 1 | 0.06 | 0.06 | 0.07 | 0.08 | 0.05 |
| Comparative Example 2 | 0.05 | 0.09 | 0.14 | 0.25 | 0.04 |
| Example 2 | 0.06 | 0.11 | 0.15 | 0.19 | 0.04 |
| Comparative Example 3 | 0.06 | 0.10 | 0.14 | 0.29 | 0.04 |
| Comparative Example 4 | 0.06 | 0.24 | 0.55 | 0.80 | 0.04 |
| Example 4 | 0.08 | 0.38 | 0.45 | 0.76 | 0.04 |
| Comparative Example 5 | 0.04 | 0.05 | 0.13 | 0.41 | 0.05 |
| Comparative Example 6 | 0.04 | 0.12 | 0.29 | 0.65 | 0.05 |
| Example 6 | 0.05 | 0.31 | 0.40 | 0.59 | 0.05 |
| Comparative Example 7 | 0.06 | 0.09 | 0.12 | 0.22 | 0.05 |
| Comparative Example 8 | 0.06 | 0.24 | 0.37 | 0.45 | 0.04 |
| Example 8 | 0.07 | 0.25 | 0.38 | 0.39 | 0.04 |

TABLE 3-2-continued

| Evaluation sample | Before test | Background heat resistance 80° C. | 90° C. | 100° C. | Background water resistance |
|---|---|---|---|---|---|
| Comparative Example 9 | 0.11 | 0.09 | 0.08 | 0.11 | 0.03 |
| Comparative Example 10 | 0.09 | 0.10 | 0.14 | 0.21 | 0.03 |
| Example 10 | 0.08 | 0.14 | 0.16 | 0.21 | 0.03 |

From Tables 3-1 and 3-2, it is found that the recording sheet of the present invention did not develop color before the test and thus no fogging occurred in the background and had better background heat-resistance compared to the case where EGPE was used as a sensitizer. The background water resistance was equivalent compared to the case where EGPE was used as a sensitizer.

4) Image Storage Stability Test

With respect to individual evaluation samples, the colored images were subjected to a storage stability test in the following conditions. The results were shown in Tables 4-1 and 4-2.

[Before Test]

Each thermal recording paper was partly cut out and color was developed by use of a thermo-sensitive paper color development test machine (trade name: TH-PMH type, manufactured by OHKURA-DENKI) at a printing voltage of 17 V and a pulse width of 1.8 ms. The density of colored image was measured by a Macbeth reflection densitometer (filter used herein: #106).

[Heat Resistance Test]

Each thermal recording paper was partly cut out and saturated color development was carried out in the same manner as before the test. The paper sample was stored in an incubator (trade name: DK-400, manufactured by YAMATO) of 80° C., 90° C. or 100° C. for 24 hours. After the test, the optical density thereof was measured by a Macbeth reflection densitometer (filter used herein: #106).

[Water Resistance Test]

Each thermal recording paper was partly cut out and saturated color development was carried out in the same manner as before the test. The paper sample was soaked in water at 25° C. for 7 days. Thereafter, the optical density thereof was measured by a Macbeth reflection densitometer (filter used: #106).

TABLE 4-1

| Evaluation sample | Before test | Image heat resistance 80° C. | 90° C. | 100° C. | Image water resistance |
|---|---|---|---|---|---|
| Comparative Example 1 | 1.27 | 1.29 | 1.23 | 0.86 | 1.02 |
| Comparative Example 2 | 1.25 | 1.04 | 1.01 | 0.78 | 0.48 |
| Example 1 | 1.28 | 1.27 | 1.22 | 0.85 | 1.10 |
| Comparative Example 3 | 1.31 | 1.04 | 1.00 | 0.97 | 0.97 |
| Comparative Example 4 | 1.23 | 0.95 | 0.93 | 0.91 | 0.43 |
| Example 3 | 1.22 | 1.01 | 0.97 | 0.92 | 0.73 |
| Comparative Example 5 | 1.09 | 1.08 | 1.12 | 1.06 | 1.00 |
| Comparative Example 6 | 1.17 | 1.03 | 0.97 | 0.89 | 0.97 |
| Example 5 | 1.18 | 1.14 | 1.13 | 1.05 | 1.01 |
| Comparative Example 7 | 1.24 | 1.28 | 1.18 | 0.83 | 0.88 |
| Comparative Example 8 | 1.26 | 1.01 | 0.95 | 0.71 | 0.57 |
| Example 7 | 1.28 | 1.20 | 1.12 | 0.77 | 0.90 |
| Comparative Example 9 | 1.28 | 1.28 | 1.29 | 1.18 | 0.88 |
| Comparative Example 10 | 1.30 | 1.31 | 1.23 | 1.20 | 0.67 |
| Example 9 | 1.33 | 1.34 | 1.35 | 1.28 | 0.96 |

TABLE 4-2

| Evaluation sample | Before test | Image heat resistance 80° C. | 90° C. | 100° C. | Image water resistance |
|---|---|---|---|---|---|
| Comparative Example 1 | 1.21 | 1.24 | 1.21 | 1.13 | 0.92 |
| Comparative Example 2 | 1.28 | 1.29 | 1.27 | 1.14 | 0.62 |
| Example 2 | 1.27 | 1.28 | 1.27 | 1.13 | 1.04 |
| Comparative Example 3 | 1.28 | 1.33 | 1.32 | 1.30 | 0.91 |
| Comparative Example 4 | 1.30 | 1.29 | 1.28 | 1.25 | 0.45 |
| Example 4 | 1.29 | 1.30 | 1.28 | 1.26 | 0.88 |
| Comparative Example 5 | 0.92 | 0.96 | 1.03 | 1.05 | 0.83 |
| Comparative Example 6 | 1.10 | 1.08 | 1.07 | 1.03 | 0.90 |
| Example 6 | 1.09 | 1.06 | 1.07 | 1.03 | 0.92 |
| Comparative Example 7 | 1.20 | 1.25 | 1.21 | 1.05 | 0.85 |
| Comparative Example 8 | 1.27 | 1.26 | 1.21 | 1.04 | 0.68 |
| Example 8 | 1.26 | 1.25 | 1.20 | 1.02 | 0.88 |
| Comparative Example 9 | 1.16 | 1.17 | 1.15 | 1.10 | 0.80 |
| Comparative Example 10 | 1.25 | 1.27 | 1.28 | 1.26 | 0.83 |
| Example 10 | 1.24 | 1.29 | 1.28 | 1.25 | 0.95 |

From Tables 4-1 and Table 4-2, it was found that the recording sheet of the present invention has equivalent image heat resistance compared to the case where EGPE was used as a sensitizer. In the case where EGPE was used, water resistance was poor depending upon the color-developing agent used in combination; however, the recording sheet of the present invention was found to exert excellent water resistance even though any type of color-developing agent is used.

The invention claimed is:

1. A recording material comprising:
   (A) at least one color former,
   (B) at least one compound selected from the group consisting of compounds represented by the following formula (X):

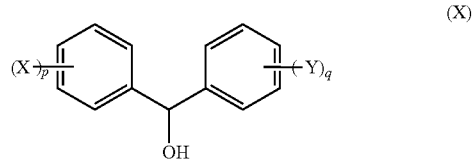

(wherein X and Y each independently represent a halogen atom, a nitro group, a $C_1$ to $C_6$ alkyl group, a $C_1$ to $C_6$ alkoxy group, a $C_2$ to $C_6$ alkenyl group, a $C_1$ to $C_6$ haloalkyl group or a $C_2$ to $C_6$ haloalkenyl group; and p and q each independently represent any integer of 0 to 5), and
(C) a color-developing agent, which is at least one compound selected from the group consisting of a compound represented by the following formula (II):

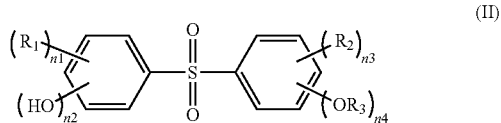
(II)

(wherein $R_1$ and $R_2$ each independently represent a halogen atom, a $C_1$ to $C_6$ alkyl group optionally having a substituent, a $C_2$ to $C_6$ alkenyl group optionally having a substituent, or an arylsulfonyl group optionally having a substituent; n1 represents any integer of 0 to 4; n2 represents 1 or 2 (with the proviso that n1+n2 is any integer of 1 to 5); n3 represents any integer of 0 to 5; n4 represents 0 or 1 (with the proviso that n3+n4 is any integer of 0 to 5); and $R_3$ is a hydrogen atom, a $C_1$ to $C_6$ alkyl group optionally having a substituent, a $C_2$ to $C_6$ alkenyl group optionally having a substituent, an aralkyl group optionally having a substituent or an arylsulfonyl group optionally having a substituent),
a compound represented by the following formula (III):

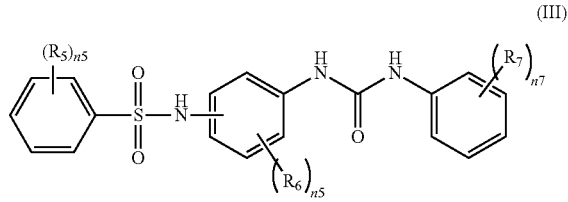
(III)

(wherein $R_5$ to $R_7$ represent a hydrogen atom, a halogen atom, a nitro group, a $C_1$ to $C_6$ alkyl group, a $C_1$ to $C_6$ alkoxy group, a $C_2$ to $C_6$ alkenyl group, a $C_1$ to $C_6$ fluoroalkyl group, an $N(R_8)_2$ group (wherein $R_8$ represents a hydrogen atom, a phenyl group, a benzyl group, or a $C_1$ to $C_6$ alkyl group), $NHCOR_9$ (wherein $R_9$ represents a $C_1$ to $C_6$ alkyl group), a phenyl group optionally having a substituent or a benzyl group optionally having a substituent; n5 and n7 each independently represent any integer of 1 to 5; and n6 represents any integer of 1 to 4),
a compound represented by the following formula (IV):

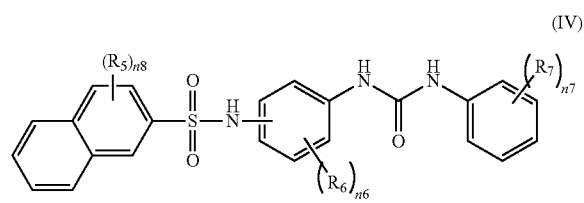
(IV)

(wherein $R_5$ to $R_7$ are the same as $R_5$ to $R_7$ in formula (III); n6 and n7 are the same as n6 and n7 in formula (III); and n8 represents any integer of 1 to 7),
a compound represented by the following formula (V):

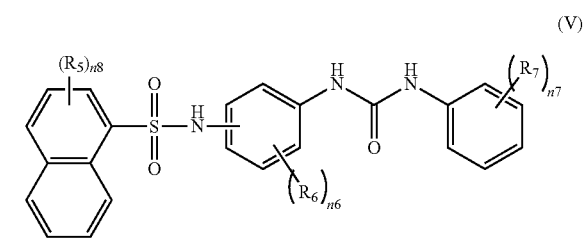
(V)

(wherein $R_5$ to $R_7$ are the same as $R_5$ to $R_7$ in formula (III); and n6, n7, and n8 are the same as n6, n7, and n8 in formula (IV)),
a compound represented by the following formula (VI):

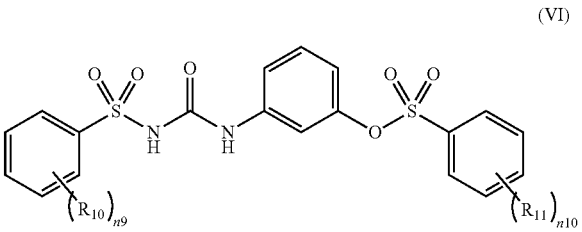
(VI)

(wherein $R_{10}$ and $R_{11}$ each independently represent a $C_1$ to $C_6$ alkyl group; and n9 and n10 each independently represent any integer of 0 to 5), and
a compound represented by the following formula (VII):

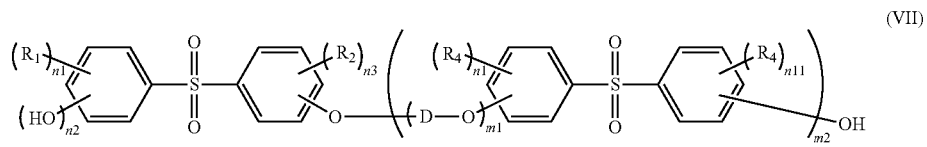
(VII)

(wherein D represents a linear, branched or cyclic $C_1$ to $C_{12}$ hydrocarbon group or a group represented by the following formula (VIII) or formula (IX):

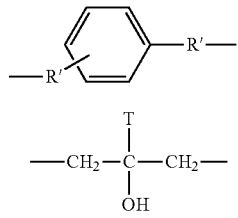

(VIII)

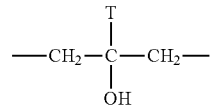

(IX)

(wherein R' represents a methylene group or an ethylene group, and T represents a hydrogen atom or a $C_1$ to $C_4$ alkyl group); m1 represents any integer of 1 to 6; $R_4$ each independently represent a halogen atom, a $C_1$ to $C_6$ alkyl group, or a $C_2$ to $C_6$ alkenyl group; n11 each independently represent any integer of 0 to 4; m2 represents any integer of 1 to 6; and $R_1$, $R_2$, n1, n2, and n3 represent the same as $R_1$, $R_2$, n1, n2, and n3 in formula (II)).

2. The recording material according to claim 1, wherein the color former is a fluoran dye.

3. A recording sheet having a recording material layer formed from the recording material according to claim 2 on a support.

4. A recording sheet having a recording material layer formed from the recording material according to claim 1 on a support.

* * * * *

UNITED STATES PATENT AND TRADEMARK OFFICE
CERTIFICATE OF CORRECTION

| | |
|---|---|
| PATENT NO. | : 10,226,957 B2 |
| APPLICATION NO. | : 15/546202 |
| DATED | : March 12, 2019 |
| INVENTOR(S) | : Shuntaro Kinoshita et al. |

Page 1 of 1

It is certified that error appears in the above-identified patent and that said Letters Patent is hereby corrected as shown below:

In the Specification

Column 3, formula (VII), change "n1" next to $R_4$ to --n11--.

In the Claims

Claim 1, formula (III), change "n5" next to $R_6$ to --n6--.

Claim 1, formula (VII), change "n1" next to $R_4$ to --n11--.

Signed and Sealed this
Twenty-eighth Day of May, 2019

Andrei Iancu
*Director of the United States Patent and Trademark Office*